United States Patent [19]
Jonkers

[11] 3,889,802
[45] June 17, 1975

[54] BELT CONVEYOR AND METHOD FOR OPERATING SUCH A CONVEYOR

[76] Inventor: Cornelius O. Jonkers, Morshoekweg 5, Hengelo, Netherlands

[22] Filed: Sept. 12, 1973

[21] Appl. No.: 396,436

[30] Foreign Application Priority Data
Apr. 17, 1970 Netherlands...................... 7005538

[52] U.S. Cl. .............................................. 198/184
[51] Int. Cl. .......................................... B65g 15/00
[58] Field of Search...................... 198/184, 191, 192

[56] References Cited
UNITED STATES PATENTS
| | | | |
|---|---|---|---|
| 756,600 | 4/1904 | Dodge............................ | 198/184 X |
| 2,759,596 | 8/1956 | Keller............................. | 198/192 R |

*Primary Examiner*—Evon C. Blunk
*Assistant Examiner*—Douglas D. Watts
*Attorney, Agent, or Firm*—Fleit & Jacobson

[57] ABSTRACT

This invention relates to a belt conveyor system in which the operative run moves over a bed with a perforated flat or troughed supporting surface and a viscous fluid such as air under pressure is admitted between the lower surface of this operative run and the perforated surface for supporting the operative run, via the perforations in the supporting surface. The perforated bed is the upper side of a box-like hollow frame, containing air or other gaseous fluid under pressure, so that the air flows through the perforations of the bed, and forms a fluid-film between the bed and the belt.

6 Claims, 11 Drawing Figures

INVENTOR
Cornelius O. Jonkers

BELT CONVEYOR AND METHOD FOR OPERATING SUCH A CONVEYOR

Belt conveyors of the above given type are known in several embodiments. They offer the advantage that the friction between the belt and its support is decreased considerably, which gives less loss of friction energy, less heat development, less wear, less moving parts and higher reliability as compared with structures which only have mechanical supports for the operative run of the conveyor, e.g., by rollers or discs.

In one of the known earlier proposals the perforated bed is provided over its entire surface with a very large number of openings, e.g., openings of a diameter of 3.2 mm at mutual distances of about 5 cm for admitting air under pressure below the operative belt run. If the openings are over the entire surface of the bed, this has the disadvantage that the edge parts of the belt which offer the least resistance will permit considerably more air to pass than will be forced through the central part, and accordingly, for satisfactory operation, there will be very high consumption of pressurized air and thus, very high power requirements. If, to avoid these high power requirements, the air flow rate is lowered, the air pressure will become too low to lift the central part of the belt and the air escapes only through the outer openings due to the lesser resistance of this path. Thus, the central part of the belt will contact the perforated bed and cause high frictional energy losses.

Because of the large total area of the openings, such known belts are also highly sensitive to unequal load on different parts of the belt, as there is a strong tendency of the air to escape through the openings near the less loaded parts of the belt, or the unloaded parts of the belt. Under these conditions, no air escapes through the openings under the heavier loaded or unloaded parts, thus causing again high frictional energy losses. Such proposals with uniform distribution of air openings in the floor or trough bottom are based upon the principle that the air supports the belt not only by its static pressure, but to a considerable extent by the impulses generated by the impinging of the upwardly directed jets of air passing through the openings on the lower surface of the belt.

In another known earlier proposal, air for supporting the belt is admitted in a narrow central zone between the longitudinal edges of the belt through porous plates with a very large number of small openings giving considerable throttling of the air. This structure is much better than the earlier described one with uniformly divided openings. The principle of this other proposal is that the belt is supported by the static air pressure which decreases gradually towards the edges, the viscous friction of the air, flowing in a thin layer between the moving belt and the bed, thus allowing a good distribution of pressures of the air all over the underface of the belt. Impingement of the air to support the belt is practically negligible in such known structures, the porous plates giving considerable throttling. This gives a situation in which less air is needed, but this air may need considerable pressure and thus high energy, as there will be a considerable pressure drop through the fine openings of the porous plates, being made, for example, from sintered metal powder or ceramic material. Moreover, known structures employing porous plates have the disadvantage that the plates can easily become clogged because in practice the air will always contain dust particles, liquid droplets, etc.

In all these known air belt systems, the total energy for operating the belt conveyor is so high that such structures cannot compete efficiently with belts with the usual mechanical supports, e.g., by idlers.

In view of the above disadvantages of known structures, such air belt conveyors, to the present time, have not been accepted commercially in practice. The present invention, however, provides a solution to these problems that have plagued the art and for the first time provides a belt conveyor system using this same principle of supporting the belt by a somewhat viscous fluid like air, that is a commercial reality. The belt conveyor according to the invention thus obtained does not require more energy than known belt conveyors with mechanical supports, while having all the advantages of fluid supported conveyors as regards nearly no wear and an absence of moving parts.

Accordingly, the present invention provides a novel and unique fluid supported belt conveyor of the type described above by virtue of the discoveries that, contrary to prior knowledge and opinions, not only the pattern of the perforations in the bed is a critical factor, but also the number of openings per unit belt length is a critical factor and the area of openings (size holes) per unit belt length is a critical factor. There appears to be no recognition by the art of this very important criticality which deals with and solves the important problems of partially loaded and partially unloaded belts. The foregoing is accomplished by the inventive belt conveyor being characterized in that at least 75% of the total flow area of the openings is situated within the area of the bed corresponding with the central half of the width of the belt, wherein said openings in the bed corresponding with said central half of the width of the belt have a total flow area per square meter belt surface area $\alpha$ which is larger than 0.2 cm$^2$ per square meter and smaller than 10 cm$^2$ per square meter, said belt conveyor further being characterized in that the mean number n of openings corresponding with said central half of the belt width per meter length of the bed is higher than ½B and less than 50, and in which the following relationships are satisfied:

$$\alpha = A/BL$$

$$n = N/L$$

where
- $A$ = the total flow area of the openings in the bed within the area corresponding with the central half of the belt in m$^2$;
- $B$ = the width of the belt in m;
- $L$ = the length of the bed in m;
- $N$ = the total number of openings within the area of the bed corresponding with the central half of the belt.

Hereby it is meant by the flow area of an opening the smallest passage area for the fluid to flow through that opening, whilst the total flow area of the openings is the algebraic sum of all flow area's of the openings.

With this construction, a very low amount of energy is required for the fluid, excessive friction and wear between belt and bed is avoided and clogging of the apparatus from the air supply is also avoided. Moreover, such a belt is able to operate adequately without nearly any mechanical contact between belt and bed, even with considerable differences in load and sudden changes in load between one zone and the other including zero loading.

When the inventive belt conveyor system is constructed in the above manner the total air flow through the openings of the perforated surface and the total area of the openings are much smaller than in known structures. By keeping this area below a certain value, high frictional energy losses encountered especially when the belt is non-uniformly loaded can be avoided successfully on a commercial basis. In practice, there will always be moments that the belt is not evenly loaded, for instance when starting or stopping the supply of material on the belt, or when this supply is variable or intermittent, there will be unloaded or partially loaded portions of the belt. If only a part of the belt is laden with material and the other part is unloaded, the air tends to escape through the openings in that part of the perforated bed which is near the unloaded part. If the total area of these openings is large as in prior art systems, the pressure drop through the openings will be low. As the pressure of the air film under the unloaded part of the belt will also be low, the pressure of the air in the hollow frame may easily be lower than the pressure required to lift the belt and form an air film under the loaded part. Thus no air film may form under the loaded part of the belt and the friction between this part of the belt and the bed will be very high thereby causing unduly high friction losses.

This detrimental effect is overcome by the present invention in that the total flow area of the openings is selected to be within critical limits. Likewise, if the area of the openings is made too small, a very high resistance to the air is presented and therefore, in order to maintain an air flow large enough to form an air film between the belt and the perforated surface of sufficient thickness, the pressure drop over the small openings would be unduly high, thus causing high energy requirements to maintain the air flow.

These drawbacks are avoided by the invention because of the discovery that the pattern of holes, hole size and number of holes are critical factors. The area of the openings, according to the teachings of the invention, is selected within critical limits to achieve the objective that, no matter how unevenly the belt is laden, the energy to drive the partly loaded belt does not exceed the energy to drive the fully laden belt. Moreover, the total amount of energy to drive the belt and the energy to excite the air flow, is less than, or at least not considerably larger than, the energy required to drive a conventional belt conveyor supported, for example, by idlers.

A further facet of this discovering is that the number and spacing of the individual openings in the perforated bed depends on a number of factors. It has been found that, even when the openings are spaced rather wide apart, a good and unbroken air film is still formed. The maximum spacing of the openings, giving a good airfilm, depends on a number of factors, as for example, the belt speed, the bulk weight of the material on the belt and the stiffness of the belt. It has been found that a good air film is obtained and practically no clogging of the openings occurs if, in the area corresponding with the central half of the belt, the mean number n of the openings per meter length of the perforated bed is higher than ½B and less than 50.

In order to avoid the danger of clogging of the openings in the perforated bed, these openings should not be too small. Preferably the flow area $O$ of each opening in the floor or trough bottom, that is the area where the openings has its smallest cross-section suffices the requirement $0.8 \times 10^{-6} < O/B < 50 \times 10^{-6}$ in which $O$ is expressed in m² and $B$ is the width of the belt in m. Of course, the exact size of the openings must be selected so that the total area of the openings $\alpha$ and the mean number of opeenings per meter length $n$ are within the above stated limits.

As indicated above, at least 75 percent of the total flow area of the openings in the perforated bed is within the part of the bed corresponding with the central half of the belt. In other words, at least about three-fourths of the total flow area of the openings in the perforated bed is situated at a distance less than one fourth part of the belt width from the centerline of said bed corresponding with the center line of the belt.

When the bed is well manufactured so that it has a smooth surface with only very small variations from its correct shape, it will not be necessary to provide any openings in the bed outside said central area, as the air film between belt and bed will be stable. If, however, the bed is less well manufactured so that there are parts with relatively large variations from the correct shape, it may be advantageous to provide some openings outside said central area in order to lower frictional energy losses.

Thus, in many cases it may be preferable to make the openings in the proximity of the central part of the belt. For example, the openings may be limited to a single row in the central part or to two or three rows in the central part. There may, however, be openings in the upturned edges of the trough bottom, along which the upturned edges of the belt move to form a trough for conveying a considerable quantity of material.

In any event the total flow area of these outer openings should always be less than about one fourth part of the total flow area of all openings in the bed.

The belt conveyor system according to the invention is preferably provided with means to supply the fluid to the openings in the perforated surface. Preferably, the supply means is made such that it can supply in normal operation a quantity of fluid which is determined by the relation:

$$q = V/(B \times L) < 4 \times 10^{-2}$$

In this relation:
 $q$ = mean flow of fluid per square meter belt area
 $V$ = the quantity or maximum quantity of fluid supplied to said openings as determined by the means used thereto, said quantity being expressed in normal m3 per second [m3 (STP) at atmospheric pressure and room temperature per second].

Preferably $q$ is between 0.002 and 0.010 cu.m. per sq. metre.

The quantity of fluid is of course not always absolutely determined by a fan, blower or the like as the quantity will depend upon the pressure according to the pressure-quantity characteristics of the fan or blower. It case of a considerable influence of this pressure on the quantity, the above given formula is based upon the highest quantity for the lowest pressure difference as derived from the characteristic for pressure and quantity of the fan or the like. This is why V is said to be either the quantity or the maximum quantity of said fluid.

Having the parameters outlined above, the pressure of the air or other fluid supplied may be easily determined. If the air pressure is too high, this will be perceived readily in practice and it can be adjusted to the minimum air pressure suited for supporting the belt without giving unnecessarily high air leakage.

The present invention also relates to arrangements in which the belt merges from a plane condition on an end drum to a trough-shape above the floor or trough bottom in a manner which is best suited for the present system. To this end, there are guide plates or the like along the edges formed in such a way that the edges of the belt in the transition area between an end drum and the trough are guided to take up a position in which these edges are substantially circular with a radius being at least twice the width of the belt.

Preferably $\alpha$ is larger than 0.6 cm² per sq. meter and smaller than 3.5 cm.² per sq. meter and n is greater than 1/B and less than 10.

In accordance with another aspect of the invention, it is possible to locate the fluid supply below the belt in the bottom of a channel with open top opening below the belt. Such a channel can improve the distribution of the supplied air in the longitudinal direction of the belt. However, the cross-section area of such a channel may often be too large with the result that the belt becomes unstable, as the fluid would too easily escape to parts of the belt below which the resistance to the flow of the fluid is smaller, e.g. by differences in load of the belt in different zones. According to a further development of the invention this problem has been solved in that the surface of the cross-section of the channel has to fulfill the requirement $$F^3/E^2 < 5 \times 10^{-10} \times B^2,$$

in which $F$ is the area of the said cross-section in m². $E$ is the circumference of the cross-section in m, $5 \times 10^{-10}$ is a constant with the dimension $m^2$ and B is the width of the belt in m.

The result is a better distribution of the air with stable functioning of the conveyor in that the channel is sufficiently narrow.

The invention will now be explained with reference to the enclosed drawing giving more or less diagrammatically several possible embodiments.

Figure 1:
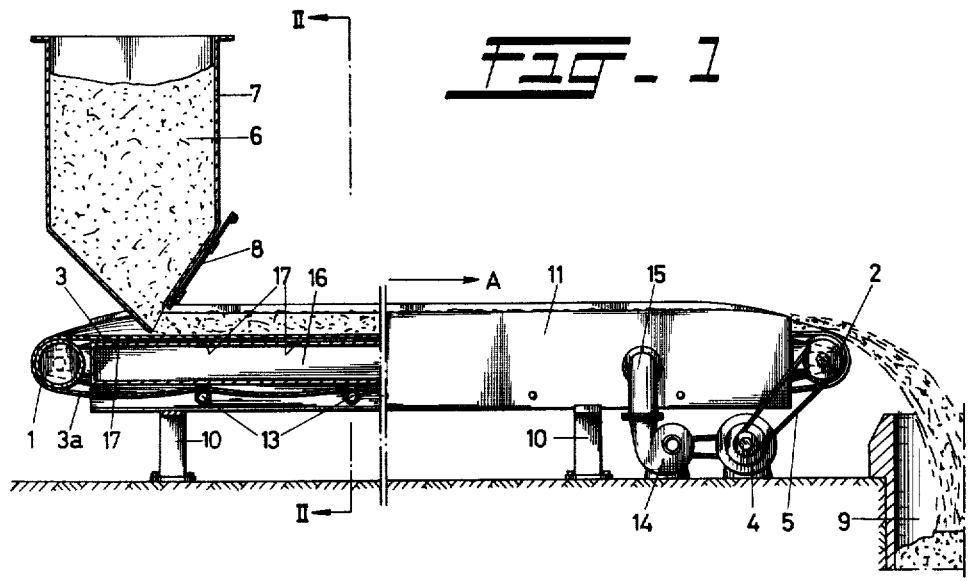
FIG. 1 shows a belt conveyor with the central part broken away, in a preferred embodiment according to the invention.

The conveyor shown in FIG. 1 has two end rollers 1 and 2 and an endless belt 3 guided over said rollers.

Roller 2 is driven by an electric motor 4 with the aid of a driving belt 5, such that the belt 3 moves in the direction given by the arrow A. The material 6 to be conveyed, e.g. a cereal, flows from a hopper 7 on to the belt 3 through an opening, provided with a metering slide 8, and is conveyed by the belt into the direction of end roller 2, where it is jettisoned from the belt into a container 9 or the like. The frame 11 of the conveyor, supported by columns 10, has in this embodiment a shape of cross section which is clear from FIG. 2. The upper wall of this more or less box-like frame 11 is embodied as a trough 12, in which the operative run 3 of the belt is taken up, which is laden with the material 6 to be conveyed. The lower run 3a of the belt is supported by supporting rollers 13. By means of a compressor 14, also driven by the electric motor 4, a fluid, in this case air, is fed under pressure through a duct connection 15 to the space 16 within the hollow frame 11. Through openings 17 in the trough bottom 12 this fluid is allowed to escape through the narrow space 18 between the trough 12 and the belt 3.

As the fluid between the trough and the belt continuously forms an air film in which the correct distribution of pressures is maintained mainly by the tendency of the air to flow gradually from the openings 17 to the side edges of the belt, mainly in a laminar flow, there is not more than negligible friction between the belt and the trough.

Figure 2:
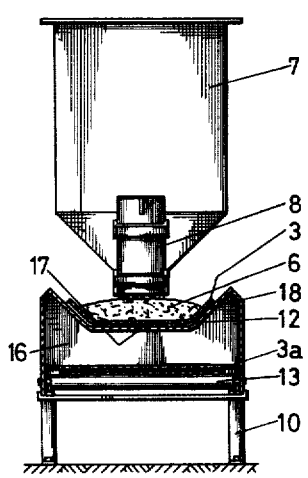
FIG. 2 is a cross-section of the conveyor of FIG. 1 along the line II—II in FIG. 1.
Figure 3:
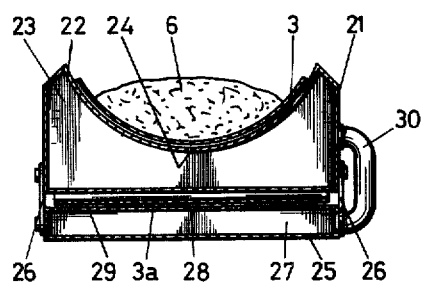
FIGS. 3 and 4 are similar cross-sections as FIG. 2 but through different embodiments of the belt, in which also the lower run thereof is supported by a fluid.

FIG. 3 shows a cross-section of a conveyor with a frame being box-like and consisting of two parts, an upper part 21 with a partly cylindrical trough 22 and a box-like lower frame 25. The fluid, in this case air, flows from the box 23 through openings 24 to the space between the belt 3 and the trough bottom 22 to form an air layer for supporting the belt laden with the material 6. The box-like lower frame 25 is connected by strips 26 or the like to the upper frame 21 and the interior 27 of the lower frame 25 is also an enclosed space for the fluid and both this space and space 23 are fed by a compressor with this fluid, e.g. air. Openings 28 in the upper wall 29 of the lower box-like frame 25 allow part of the air to form an air layer below the non-loaded lower run 3a of the conveyor belt, so that no supporting rollers like 13 in FIGS. 1 and 2 are necessary. If desired, the upper frame 21 and the lower frame 25 are connected by ducts 30, so that only one fan or compressor will suffice to feed the entire device. Of course the non-loaded return run 3a of the belt does not need so much air to be adequately supported as the loaded upper run, so that the number of openings for this lower run may be smaller than for the loaded upper run.

Figure 4:
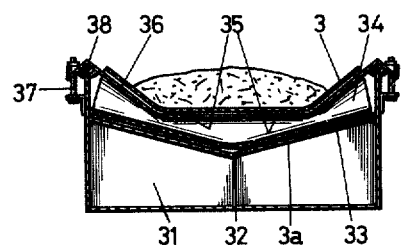

FIG. 4 shows a somewhat different embodiment in which also the lower run is supported by the fluid. In this case both box-like frame parts form an integral structure. Fluid such as air is fed to the lower space 31, flows through openings 32 into the upper space 34 and meets the return run 3a of the belt in this space and forms a pillow between this lower run and the trough bottom 33.

Through the slot like space between the lower run and the trough 33 the fluid flows into the space 34 and thereupon through the openings 35 in the trough bottom 36 to below the laden upper run 3 of the belt. This gives a simple structure, but the flow of the air or the like through openings 32 and 35 in series is not always favorable as the pressure is lower at the openings 35, where it should be preferably be the same as or higher than in openings 32, so that in many cases FIG. 3 will be preferred. In FIG. 4 connecting means 37, easily detachable, make it possible to remove the upper trough 36 from the box-like lower structure and there may be sealing means 38, e.g., rubber strips, on the top edge of the trough.

Figures 5, 6, 7, 8:
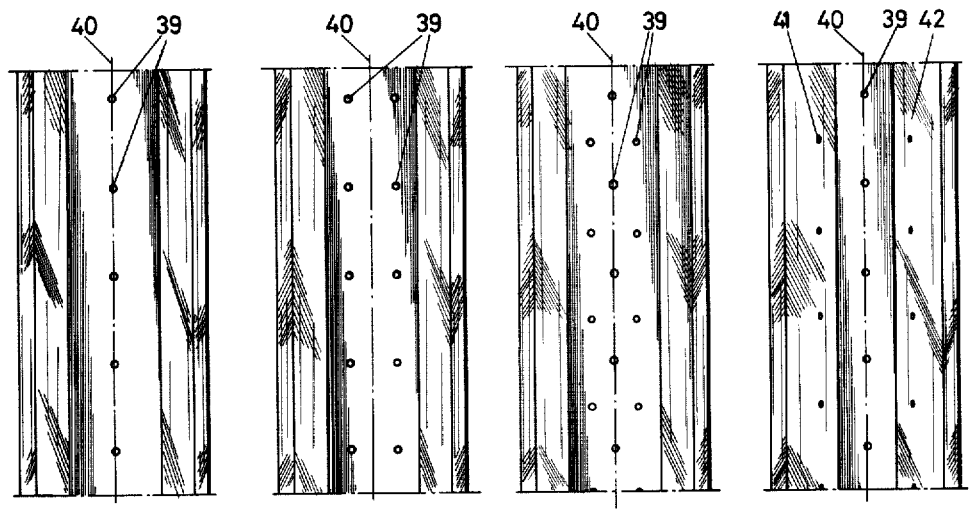
FIGS. 5–8 show the floor or trough bottom for supporting the belt as seen from above with the belt removed, to show several possible and preferred patterns for the openings for admitting the fluid.

FIGS. 5–8 show a number of possible patterns for the distribution of the openings for the fluid in a trough bottom having in this case a cross-section about as given in FIG. 2 and 4. The openings have been shown at a greater diameter than they will in reality often have, as otherwise they would be too small to be shown clearly, the real diameters of the openings following from the given formulae, from the attached claims and from the examples given below FIG. 8 shows in accordance with one embodiment of the invention that the openings in the perforated bed may be of different size. In the FIG. 8 bed, the outer openings 41 have a diameter which is about one third the diameter of the central openings 39 so that about 82 percent of the flow passage area of the openings is in the central part of the bed.

It has appeared from experiments that the openings 39 should preferably be arranged symmetrically with respect to the longitudinal axis 40 of the trough. In FIG. 5 there is one row of central openings in the center line 40, in FIG. 6 there are two rows of openings, not staggered, but they could be staggered in the longitudinal direction. In FIG. 7 there are three rows of openings and in FIG. 8 there is onw row in the centre and there are openings 41 in the upturned side-walls 42 of the trough which openings 41 are preferably smaller than the openings in the center line 40 but the openings 39 and 41 together suffice the requirements of the given formulae in the claims and in this specification.

Figure 9:
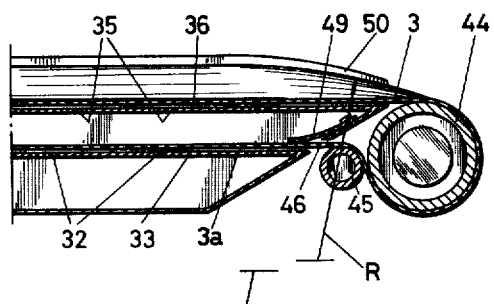
FIGS. 9 and 10 show the structure of the conveyor near an end roller where the belt merges from the operative into the non-operative run.
Figure 10:
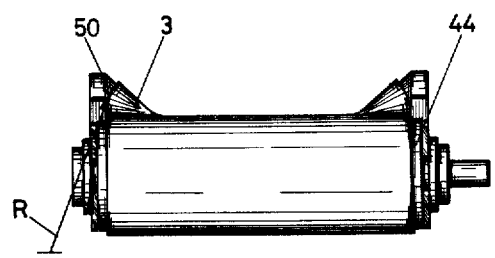

FIG. 9 shows a vertical longitudinal section and FIG. 10 a view from the right in FIG. 9 of the end of a belt conveyor according to the invention essentially as given in FIG. 4. The trough has such a shape that the upper run 3 of the belt gradually merges from the trough shape into a plane cylindrical shape on the end roller 44. The trough at 50 forms guide walls which guide the endes of the belt in such a way that these edges take up a substantially circular shape with a radius of curvature indicated by R being about twice the width of the belt. In FIG. 9 this radius is shortened and interrupted, in FIG. 10 it is only in part shown. The lower run of the belt is also guided by a smaller roller 45 and enters the box-like frame of FIG. 4 through a slot 46 so as to run over the plate 33 with openings 32 to be supported by air issuing therefrom. This plate 33 will first be plane but will gradually merge into the trough-shape as given in FIG. 4. A sealing slab 49 counteracts leakage of the fluid through the slot 46 and this slab 49 pushes resiliently against the lower run of the belt 3a. A similar slab could be present in contact with the lower surface of this run 3a.

The invention as to the formulae will now be explained in more detail on the basis of several examples. In the first example, the distance between the end rollers is 31 m, the length of the trough L is 30 m and the width of the belt B is 0.4 m. The driving means with electric motor 4 and belt 5 give the conveyor belt a normal operating speed, also being the maximum speed, $v=2$ m per second. Per meter length of the conveyor belt sixteen openings 39 as shown in FIG. 7 were applied according to such a pattern. The diameter of the openings was 0.25 cm. The quantity of air supplied per meter length of the conveyor belt which would be supplied by the blower 14 of FIG. 1 as a maximum, so without considerable back pressure, was $1.6 \times 10^{-3}$ normal $m^3$ per second.

It follows therefrom that:

$\alpha = A/LB = (16 \times \pi/4 \times 0.25^2)/(0.4 \times 10.000) \approx 2 \times 10^{-4}$ $m^2$ per sq.meter $q = V/BL = 4 \times 10^{-3}$ The flow area $O$ of each opening was
$O = [(\pi/4) \times 2.5^2] = 4.9 \times 10^{-6}$ and therefore,
$O/B = (4.9 \times 10^{-6})/0.4 = 12.3 \times 10^{-6}$ The speed of the conveyor belt $V$ is in practice often chosen if the belt is wider. So for widths of the belt of 0.4 to 0.5m speeds of about 1.3m per second are normal, whereas for widths of the belt of 2.6 m speeds of 5 m per second are not unusual. At these higher speeds it is sufficient to use a relatively smaller number of openings per meter length of the belt by the better entrainment action of the belt on the fluid, but of course if the belt is wide, there should be more openings in the width direction of the belt so that for very wide belts a structure e.g., according to FIG. 5 will not be very suited.

Figure 11:
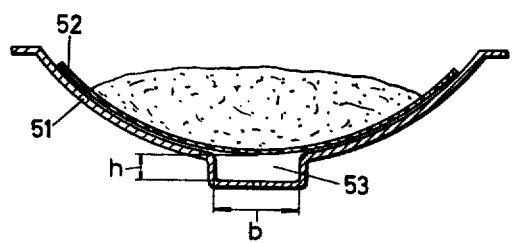
FIG. 11 shows the upper part of a belt conveyor provided with a central channel for the distribution of the fluid.

FIG. 11 shows the upper part of a conveyor comprising a trough 51 and a belt 52. The trough has a central channel 53 with fluid supply openings 54. The channel 53 has a surface with cross-section $F$ in $m^2$ and a circumference $E$ in m. A proper operation is obtained if the requirement is fulfilled.

$$F^3/2E < 5 \times 10^{-10} \times B^2$$

with e.g. a width of the belt of $B=1$ m and a width of the channel $b=0.1$ m with a height of $h=0.0027$ m, $F=2.7 \times 10^{-4}$ $m^2$ and $E=0.2054$ m.

The ratio $F^3/E^2 = 4.7 \times 10^{-10}$ which means that the dimensions of the channel are within the critical limitations and therefore acceptable.

The invention has been shown and described in terms of stated criticality and specific preferred embodiments. Such changes and modifications which do not deviate from the stated criticality or preferred conditions are deemed to fall within the purview of the inventive concepts taught herein.

What is claimed is:

1. In a belt conveyor system in which the operative run moves over a perforated bed, means being present to admit somewhat viscous fluid such as air under preessure between the lower surface of this operative run and said perforated bed for supporting said operative run, said fluid being admitted through openings in said perforated bed, the improvements comprising at least 75 percent of the total flow area of said openings situated within the area of the bed corresponding with the central half of the width of the belt, said openings in the bed corresponding with said central half of the width of the belt have a total flow area $\alpha$ per square meter belt surface which is larger than about $0.6cm^2$ per square meter and smaller than about $3.5cm^2$ per square meter, the mean number n of openings corresponding with said central half of the belt width per meter length of the bed being higher than about $1/B$ and less than about 50, and in which the following relationships are satisfied:

$$\alpha = A/BL$$

and $$n = N/L$$

where $A$ = the total flow area of the openings in the bed within the area corresponding with the central half of the belt in m2;
$B$ = the width of the belt, in m;
$L$ = the length of the bed, in m;
$N$ = the total number of openings within the area of the bed corresponding with the central half of the belt;

and the flow area $O$ of a single opening satisfying the requirement $0.8 \times 10^{-6} < O/B < 50 \times 10^{-6}$ in which $O$ is measured in m² and $B$ in m.

2. In a belt conveyor system according to claim 1 the further improvement of the mean number $n$ of openings per meter length of the perforated surface being less than about 10.

3. In a belt conveyor system according to claim 1, the further improvement of supply means being provided for supplying fluid in a quantity which is less than about 0.04 (normal) cubic meter per second per square meter belt area.

4. In a belt conveyor system according to claim 3, the further improvement of said quantity being between about $2 \cdot 10^{-3}$ and about $10 \cdot 10^{-3}$ (normal) cubic meter per second per square meter belt area.

5. In a belt conveyor system according to claim 1, the further improvement of the belt in the proximity of an end roller merging from a plane shape on the roller to a trough shape above the floor or trough bottom by guide plates or the like such that the edges of the belt in said transition zone have a substantially circular shape with a radius of curvature which is at least twice the width of the belt.

6. In a belt conveyor system of the type recited in claim 1, the improvement of the fluid supply openings being defined by a channel with a top open towards the belt, the surface of the cross-section of the channel fulfilling the requirement $F^3/2E < 5 \times 10^{-10} \times B^2$ in which $F$ is the area of the said cross-section in m² $E$ is the circumference of the cross-section in m, $5 \times 10^{-10}$ is a constant with the dimension m² and $B$ is the width of the belt in m.

* * * * *

UNITED STATES PATENT AND TRADEMARK OFFICE
CERTIFICATE OF CORRECTION

PATENT NO. : 3,889,802

DATED : June 17, 1975

INVENTOR(S) : Cornelius O. JONKERS

It is certified that error appears in the above-identified patent and that said Letters Patent is hereby corrected as shown below:

On the title page, insert the following:

--Continuation-in-Part of Serial No. 133,610,

April 13, 1971, abandoned.--

Signed and Sealed this

Eleventh Day of February 1986

[SEAL]

Attest:

DONALD J. QUIGG

Attesting Officer

Commissioner of Patents and Trademarks